(12) United States Patent
Molleneux

(10) Patent No.: X1501
(45) Date of Patent: Apr. 28, 1811

(54) SHEARING CLOTH

(76) Inventor: Jesse Molleneux

The Schedule referred to in these Letters Patent and making part of the same containing a description in the words of the said Jesse Molineux himself of his machine for Shearing Woolen Cloth.

A frame of wood or metal is constructed, consisting of four upright corner posts, connected by transverse bars, at right angles. This square frame is three feet high, as many feet in length, and of the same number of feet in breadth. Being thus rendered firm and strong, it is ready to support the machinery. Though it is to be understood that the dimensions may be greater or less in every respect as may be deemed necessary.

The two back or hinder posts are about a foot higher or longer than the fore ones. This is done for the reception of a moveable cylinder, on which is wound or rolled a turn of cloth. This cloth is about a yard in length, and one of its ends is fastened to the cylinder, while the other is fastened by hooks to the end of the piece of cloth intended for shearing. The ends of this cylinder are received into grooves in the posts at each extremity, and can be taken out and put in at pleasure.

The piece of cloth intended to be sheared is hooked fast and rolled up upon this cylinder so revolving on its axis. On unrolling it passes first over and along another cylinder, situated almost immediately below it, at the distance of six inches or thereabouts. The former of these is called the first, and the latter the second cylinder. This second cylinder is armed with short brads whose operation is to hold the cloth equable and steady, as well as to expand it as it is unrolled and pulled along.

As it thus passes along, it is applied, to a third cylinder. Here, as it is uniformly and duly spread and stretched, it is subjected to the operation of the shears or cutters, presently to be described.

Having undergone the operation of shearing, the cloth is moved successively along to the fourth cylinder, situated immediately under the third, and almost in contact with it. Thence it descends to the floor or with a grating or basket placed for the purpose of receiving it.

Such is the apparatus for rolling unrolling applying and moving the cloth.

1501X

I claim further as part of my invention, a blade or plate of [illegible] steel as the basis of this my machinery for cutting or shearing the cloth. This plate is about two feet and one half long and three inches wide; though its dimensions may be va-ried to suit the circumstances of the case. One edge of the blade is connected by means of a wooden bar with a [illegible] coarse piece of cloth which forms a bag to receive the flocks, and the other edge or front part of the blade is exposed on its upper side to the action of certain moveable metallic bodies called cutters.

These cutters are eighteen in number they may be more or less. They are connected obliquely to one of the transverse timbers of the machine. This timber lies horizontally, and the cutters project from the posterior or inner side. When at rest they form an angle of about twenty two degrees; though this may vary at discretion. In this slanting situation they are fastened at one extremity to the transverse timber by rivets or pins, and at the other extremity to another horizontal and parallel timber, by as many metallic bars. There is a clasp of metal connecting these bars with the cutters. And there are also springs equally numerous with the cutters, and made of good elastic wire. These springs are so constructed as to act or push downward. They proceed from a horizontal timber lying parallel to and very near the one which sustains the cutters, and immediately above it. They project from it at a similar angle. At about the length of ten inches, which is likewise the length of the cutters, these springs are bent downward at a right angle, and terminate in a fork or crotch, pressing upon the backs of the cutters, and applying them closely, yet gently to the blade or lower cutter.

The timber to which the cutters are connected, is also connected to the timber that supports the springs by two or more hinges and these two timbers are further connected by two or more screws. The operation of these hinges and screws, is to regulate the pressure of the springs upon the cutters so that it may be more or less forcible, according to the workman.

The eighteen bars are connected to a horizontal timber, to which is joint-ed a perpendicular piece of copper or other metal, called a scraper. This scraper is two feet and a half long and one inch and a half wide, more or less. Its operation is to raise the nap on the cloth passing beneath it, on its way to the shears. There is a joint in the part of the machine supporting the scraper,

[illegible], cutters and springs with their respective timbers by which they may all
be clasped together where the blade and the third cylinder on which it rests,
high enough to put in and adjust the piece of cloth intended to be sheared and
at the same time to facilitate repairs.

To enable the edge of the blade to lie closer to or further from the cloth
and the cutters to shave more or less of the nap from its surface, there are two
screws behind and in the rear of it which by tightening and pushing it for-
ward, make the instrument cut the longer, and by relaxing and suffering
it to recede, cause it to shear the closer.

For the purpose of enabling the fourth cylinder to perform its func-
tions the more accurately in drawing the cloth regularly and smoothly
along after the operation of the shears has been performed, the two extre-
-mities of its axis are suspended on wires which by their strength and
elasticity, press it upwards towards the third cylinder with the requisite
force.

And in like manner the too easy and rapid motion of the first
cylinder is prevented and the cloth is forced to set tight to the brads by means
of two levers acted upon by two springs which are supported by the two longer
parts of the frame one to each.

The machine may be put into action by men, horses or other animals
or by wind or water. Its moving powers are cranks, axles, wheels, whirls, pin-
-ions, cogs, chains, and bands.

One side of the apparatus is calculated to give motion to the cloth,
as it passes from the first to the fourth cylinder, and the other side to give ac-
-tion to the cutters which playing upon the blade perform the office of shears.

The whole movements are so regulated as to bring the cloth success-
-ively and regularly along, so that its frieze or nap may be removed as it
passes smoothly entirely and neatly from every portion of the surface.

That a great excellence, and indeed the most valuable peculiarity
in this machine and invention, is that the cloth can never be cut to pieces
or spoiled by the shears. For the cutters are so nicely regulated and grad-
-uated, that if by any accident the cloth should get between them and the
blade, the springs will yield and give way, before the cloth can be damaged And in this particular the [illegible] supposed [illegible]
preference above every thing of this kind now in being or in use.
I further claim a method of shearing cloth by my said machine and
invention, of three quarters of a yard in width, and but one [illegible] in passing
once through the machine. It is at the same time proposed to construct these
machines on the same principles and in the same general form, wide enough
for shearing cloth six quarters wide, or of greater width if required. It is
moreover intended to adapt such wide machines to the shearing of two pieces
of narrow cloth at the same time by setting the foot of another post in the
middle of the hindermost transverse bar which rising with the bend behind
the second cylinder is made with its upper part to stand firm at an equal
distance from the two main posts of the frame having a similar groove on
each side to receive the end of the first cylinder, on which the cloth is rolled. The
top of this post is fastened to a cross bar of wood or metal, on the top of the main
posts and the two cylinders for receiving the narrow pieces of cloth act in the
same manner that the first cylinder does in the former part of this specification
This post is to be so framed as to be put in and taken out as may best suit the bu-
siness to be done.

Witnesses
George Cummings
Wm Peters

Jesse Molleneux (Recd & Recorded anew March 9th 1848)